United States Patent
Needham et al.

(10) Patent No.: US 10,501,340 B2
(45) Date of Patent: Dec. 10, 2019

(54) SURFACTANT REMOVAL FROM PRODUCED WATERS

(71) Applicant: CONOCOPHILLIPS COMPANY, Houston, TX (US)

(72) Inventors: Riley B. Needham, Bartlesville, OK (US); Sriram Solairaj, Bartlesville, OK (US)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 15/189,590

(22) Filed: Jun. 22, 2016

(65) Prior Publication Data

US 2016/0368786 A1 Dec. 22, 2016

Related U.S. Application Data

(60) Provisional application No. 62/182,875, filed on Jun. 22, 2015.

(51) Int. Cl.

| | | |
|---|---|---|
| *C02F 1/28* | (2006.01) | |
| *C02F 1/72* | (2006.01) | |
| *B01J 20/28* | (2006.01) | |
| *B01D 21/00* | (2006.01) | |
| *B01J 20/06* | (2006.01) | |
| *C02F 1/38* | (2006.01) | |
| *B01D 15/02* | (2006.01) | |
| *B01J 20/32* | (2006.01) | |
| *C02F 1/00* | (2006.01) | |
| *C02F 101/30* | (2006.01) | |
| *C02F 103/10* | (2006.01) | |

(52) U.S. Cl.
CPC ............ *C02F 1/281* (2013.01); *B01D 15/02* (2013.01); *B01D 21/00* (2013.01); *B01J 20/06* (2013.01); *B01J 20/28016* (2013.01); *B01J 20/3204* (2013.01); *B01J 20/3236* (2013.01); *C02F 1/288* (2013.01); *C02F 1/385* (2013.01); *C02F 1/285* (2013.01); *C02F 1/72* (2013.01); *C02F 2001/007* (2013.01); *C02F 2101/301* (2013.01); *C02F 2101/40* (2013.01); *C02F 2103/10* (2013.01)

(58) Field of Classification Search
CPC .......... B01D 15/02; B01D 21/00; B01J 20/06; B01J 20/28016; C02F 1/281; C02F 1/285; C02F 1/288; C02F 1/385; C02F 1/72; C02F 2001/007; C02F 2101/301; C02F 2101/40; C02F 2103/10

See application file for complete search history.

(56) References Cited

U.S. PATENT DOCUMENTS

| | | | |
|---|---|---|---|
| 5,843,308 A | 12/1998 | Suozzo | |
| 2011/0000854 A1* | 1/2011 | Nichols | C02F 1/281 210/666 |
| 2013/0220605 A1* | 8/2013 | Vandor | E21B 43/267 166/267 |
| 2014/0096971 A1* | 4/2014 | Keizer | E21B 37/06 166/308.2 |
| 2015/0144564 A1* | 5/2015 | Moller | C02F 9/00 210/662 |

FOREIGN PATENT DOCUMENTS

| | | |
|---|---|---|
| DE | 10 2008 038475 | 2/2010 |
| WO | 2013/090569 | 6/2013 |

OTHER PUBLICATIONS

International Search Report for parent case, App. No. PCT/US2016/038744, dated Sep. 9, 2016.
Schulze-Makuch, D et al.. "Field evaluation of the effectiveness of surfactant modified zeolite and iron-oxide-coated sand for removing viruses and bacteria from ground water", Ground Water Monitoring & Remediation. 2003. vol. 23, No. 4; abstract; pp. 69-70.
Marsalek, R., "The adsorption of SDS on ferro-precipitates", International Journal of Chemical, Molecular, Nuclear, Materials and Metallurgical Engineering. 2011. vol. 5. No. 10; abstract; pp. 872-874.
Farajnezhad, H., and Gharbani, P., "Coagulation treatment of wastewater in petroleum industry using poly aluminum chloride and ferric chloride," International Journal of Research and Reviews, Applied Sciences, vol. 13, No. 1 (Oct. 2012).
Dao, K., et al., "Adsorption Isotherm of Sodium Octylbenzenesulfonate on Iron Oxide Particles in Aqueous Solutions," Journal of Colloid and Interface Science, vol. 204, Issue 1 (Aug. 1998) (Abstract).
European Search Report issued in connection with corresponding EP Application No. 16815212.2 dated Mar. 14, 2018.

\* cited by examiner

*Primary Examiner* — Dirk R Bass
(74) *Attorney, Agent, or Firm* — Boulware & Valoir

(57) ABSTRACT

A method for removing a surfactant from a water stream includes contacting the water stream with a particulate support having a hydrous iron oxide coating to provide a treated water stream. The treated water stream has less surfactant than the water stream.

17 Claims, 3 Drawing Sheets

SURFACTANT REMOVAL FROM PRODUCED WATERS

CROSS-REFERENCE TO RELATED APPLICATIONS

This application is a non-provisional application which claims benefit under 35 USC § 119(e) to U.S. Provisional Application Ser. No. 62/182,875 filed Jun. 22, 2015, entitled "SURFACTANT REMOVAL FROM PRODUCED WATERS," which is incorporated herein in its entirety.

STATEMENT REGARDING FEDERALLY SPONSORED RESEARCH

None.

BACKGROUND OF THE INVENTION

A variety of industrial processes generate aqueous waste streams containing contaminating amounts of organic compounds. For example, in the process of crude oil production from subterranean formations, a substantial amount of water may be produced. Such oil-associated water generally contains contaminating compounds which must be removed prior to releasing the water into the environment. Other sources of produced water are encountered in the refining of crude oil. Plants which process oil products are increasingly limited by federal and state regulations as to the total organic content (e.g., soluble and dispersed hydrocarbons) of effluent water.

Surfactants are commonly used in a variety of subterranean industrial processes that generate aqueous waste streams. The surfactants can be used for a number of purposes, including as emulsifying agents, non-emulsifying agents, foaming agents, defoaming agents, viscosifying (e.g., gelling) agents, dispersants, wetting agents, and the like. While a variety of surfactants have been used in subterranean operations, various problems have been associated with their use. For instance, certain surfactants used heretofore often have undesirable environmental characteristics or may be limited by strict environmental regulations in certain areas of the world.

Thus, it is desirable to treat produced water so that it can be reused for various processes or discharged without violating environmental regulatory standards, particularly such that the surfactants are removed from the produced water. Older techniques for dealing with contaminated water involved reinjection into wells or percolation through a series of treatment ponds. These methods were unacceptable due to their high costs and environmental damage. Even so, these techniques continue to be used where no economical options exist.

Accordingly, there remains a continuing need in the art for a method of treating produced water to remove surfactants and be reused or discharged into the natural environment.

SUMMARY OF THE INVENTION

A method for removing a surfactant from a water stream is disclosed herein. The method comprises contacting the water stream with a particulate support comprising a hydrous iron oxide coating, to provide a treated water stream comprising less surfactant than the water stream.

In one embodiment, surfactant is removed from a water stream by contacting the water stream with a particulate support comprising a hydrous iron oxide coating, the supported iron oxide particulate removes waste to provide a treated water stream with reduced surfactant.

In another embodiment a hydrous iron oxide precursor to the water stream to form the hydrous iron oxide coating. The particulate support may sand including a bed of moving sand. The hydrous iron oxide precursor may contain ferric chloride, ferrous chloride, ferric sulfate, ferrous sulfate, or a combination thereof. The hydrous iron oxide precursor may be present in the water stream at a hydrous iron oxide precursor:surfactant molar ratio of 0.25:1 to 5:1, preferably 0.25:1 to 1:1, more preferably 0.5:1 to 1:1.

The water stream may be any water stream with surfactants including a produced water stream. The surfactant may be up about 50 to 400 ppm, including about 50, 75, 100, 150, 200, 250, 300, 350, or 400 ppm in the water stream. The surfactant may be any surfactant including an anionic surfactant like $C_{4-25}$ alkyl sulfonate, a $C_{6-25}$ alkylaryl sulfonate, a $C_{4-25}$ alkyl sulfate, or a salt thereof, or a combination of surfactants. The surfactant may contain dodecyl sulfate or an alkali metal salt thereof.

In another embodiment, surfactant may be at least partially degraded. The degraded surfactant may adsorb to the hydrous iron oxide coating to provide a degraded surfactant-iron-sand complex. After treatment the water stream may have less than 1 wt. %, or less than 0.5 wt. %, or less than 0.1 wt. %, or less than 0.05 wt. %, or less than 0.005 wt. % residual surfactant. After treatment the treated water stream may be separated from the particulate support, including gravity separating, filtering, centrifuging, decanting, or a combination thereof.

In one embodiment, a produced water stream containing 50 to 400 ppm of anionic surfactant recovered from an oil well is treated with a hydrous iron oxide precursor containing ferric chloride.

In another embodiment the water is oxidized prior to introducing the hydrous iron oxide precursor to the water stream.

BRIEF DESCRIPTION OF THE DRAWINGS

The invention, together with further advantages thereof, may best be understood by reference to the following description taken in conjunction with the accompanying figures by way of example and not by way of limitation, in which.

DETAILED DESCRIPTION OF THE INVENTION

Figure 1A:
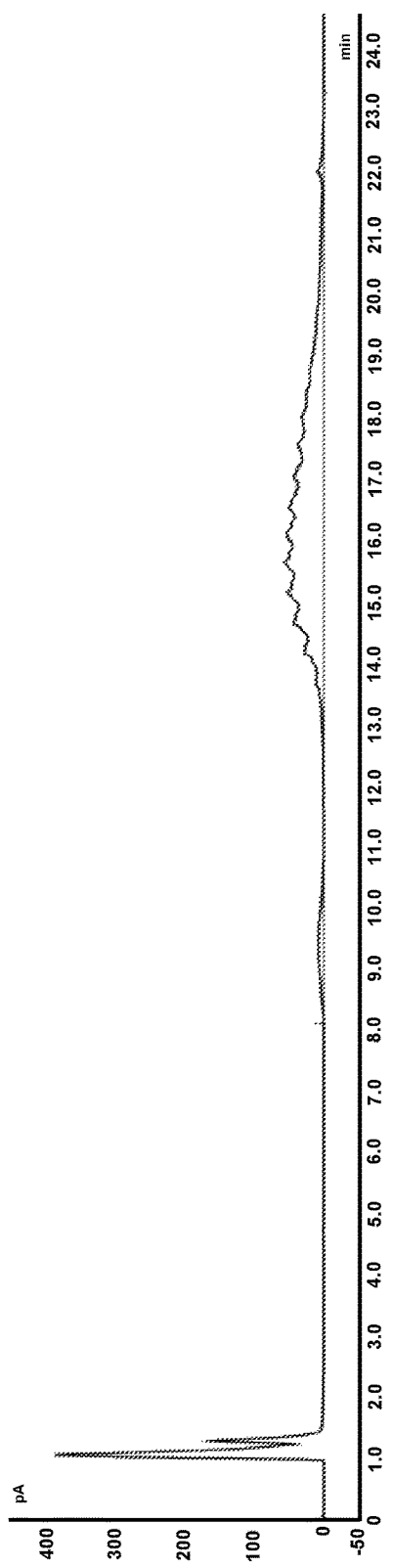
FIG. 1A is a chromatogram of a solution comprising a surfactant in water.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variation can be made in the present invention without departing from the scope or spirit of the invention. For instance, features illustrated or described as part of one embodiment can be used on another embodiment to yield a still further embodiment. Thus, it is intended that the present invention cover such modifications and variations that come within the scope of the appended claims and their equivalents.

The present inventors have discovered a method for removing a surfactant from a water stream. The method comprises contacting the water steam with a particulate support comprising a hydrous iron oxide coating to provide a treated water stream having less surfactant than the initial water stream. Without being bound by theory, it is believed that the surfactant can adsorb to the hydrous iron oxide coating, effectively removing the surfactant from the water. Advantageously, the treated water stream can be readily discharged into the natural environment (e.g., in the ocean, a lake, a pond, or the like).

The method comprises contacting the water stream with a particulate support comprising a hydrous iron oxide coating. The contacting can comprise passing the water through the particulate support.

The water stream can be a produced water stream. The term "produced water" as used herein refers to any water produced by industrial processes which generate aqueous waste streams containing trace amounts of contaminants such as oil- and water-soluble organic compounds, particularly those associated with an oil production process. Therefore, a principal source of such waste water is water produced from an oil well as a byproduct of crude oil production.

Produced water can include a number of contaminants that are generally known. For example, the produced water stream comprises one or more surfactants. The surfactant can be a nonionic surfactant, a cationic surfactant, an amphoteric surfactant, an anionic surfactant, or a combination comprising at least one of the foregoing. The surfactant can generally be any surfactant that is known and used in a process which generates a produced water stream, for example an oil recovery process.

Preferably, the surfactant is anionic. The anionic surfactant can include a $C_{4-25}$ alkyl sulfonate, a $C_{6-25}$ alkylaryl sulfonate, a $C_{6-25}$ alkylaryl ethylene oxide ether sulfonate, a $C_{10-20}$ alkyl glyceryl ether sulfonate, a $C_{4-25}$ alkyl sulfate, a $C_{6-25}$ alkylaryl ethylene oxide ether sulfate, a $C_{6-32}$ alkyl alkoxylated sulfate, a $C_{6-32}$ alkyl alkoxylated carboxylate, a $C_{6-32}$ alkyl alkoxylated sulfonate, a $C_{4-22}$ alkyl phosphonate, a $C_{6-25}$ alkylaryl phosphonate, a $C_{4-22}$ alkyl carboxylate, a $C_{6-25}$ alkylaryl carboxylate, $C_{8-36}$ perfluoroalkylsulfonates (e.g., perfluorooctanesulfonate (PFOS), perfluorobutanesulfonate), or a salt thereof, or a combination comprising at least one of the foregoing anionic surfactants. Among the specific anionic surfactants that can be used are a $C_{4-22}$ alkyl or $C_{6-25}$ alkylaryl sulfonate (e.g., octyl sulfonate, lauryl sulfonate, myristyl sulfonate, hexadecyl sulfonate, 2-ethylhexyl sulfonate, docosyl sulfonate, tetracosyl sulfonate, p-tosylate, butylphenyl sulfonate, dodecylphenyl sulfonate, octadecylphenyl sulfonate, and dibutylphenyl, sulfonate, diisopropyl naphthyl sulfonate, and dibutylnaphthyl sulfonate), a $C_{1-22}$ alkyl sulfate (e.g., lauryl sulfate, lauryl ether sulfate (SLES), myreth sulfate, and dioctyl sulfosuccinate), or a salt thereof, or a combination comprising at least one of the foregoing anionic surfactants. In some embodiments, the anionic surfactant comprises dodecylsulfate or an alkali metal salt thereof (e.g., sodium dodecylsulfate (SDS)).

Nonionic surfactants include $C_{8-22}$ aliphatic alcohol ethoxylates having about 1 to about 25 mol of ethylene oxide and having have a narrow homolog distribution of the ethylene oxide ("narrow range ethoxylates") or a broad homolog distribution of the ethylene oxide ("broad range ethoxylates"); and preferably $C_{10-20}$ aliphatic alcohol ethoxylates having about 2 to about 18 mol of ethylene oxide. Other nonionic surfactants that can be used include polyethylene, polypropylene and polybutylene oxide condensates of $C_{6-12}$ alkyl phenols, for example compounds having 4 to 25 moles of ethylene oxide per mole of $C_{6-12}$ alkylphenol, preferably 5 to 18 moles of ethylene oxide per mole of $C_{6-12}$ alkylphenol. Still others include the addition products of ethylene oxide with a hydrophobic base formed by the condensation of propylene oxide with propylene glycol. The hydrophobic portion of these compounds preferably has a molecular weight between about 1500 and about 1800 Daltons. The addition products of ethylene oxide with a reaction product of propylene oxide and ethylenediamine can also be used. The hydrophobic moiety of these compounds consists of the reaction product of ethylenediamine and excess propylene oxide, and generally has a molecular weight of about 2500 to about 3000 Daltons. This hydrophobic moiety of ethylene oxide is added until the product contains from about 40 to about 80 wt. % of polyoxyethylene and has a molecular weight of about 500 to about 11,000 Daltons.

Cationic surfactants that can be used are of quaternary phosphonium or ammonium type, having one, two, or more chains which contain an average of from 12 to 22, preferably from 16 to 22, more preferably from 16 to 18, carbon atoms. The remaining groups, if any, attached to the quaternary atom are preferably $C_1$ to $C_4$ alkyl or hydroxyalkyl groups. Although it is preferred that the long chains be alkyl groups, these chains can contain hydroxy groups or can contain heteroatoms or other linkages, such as double or triple carbon-carbon bonds, and ester, amide, or ether linkages, as long as each chain falls within the above carbon atom ranges. Examples include cetyltriethylammonium chloride, diethylmethyl-(2-oleoamidoethyl)ammonium methyl sulfate, cetyl trimethylammonium bromide, dimethyl distearyl ammonium chloride, octadecyltrimethylammonium chloride, stearamidopropyldimethyl-fi-hydroxy ethyl ammonium nitrate, stearamidopropyldimethyl-B-hydroxyethyl-ammonium dihydrogen phosphate, N,N-dimethyl-N-benzyl-N-octadecyl ammonium chloride, N,N-dimethyl-N-hydroxyethyl-N-dodecyl ammonium chloride, N,N-dimethyl-N-benzyl-N-octadecenyl ammonium chloride, N,N-dimethyl-N-benzyl-N-dodecyl ammonium chloride, N,N-dimethyl-N-hydroxyethyl-N-benzyl ammonium chloride, hexadecylpyridinium chloride, hexadecyltriethylammonium bromide, octadecylbenzyl trimethylammonium methosulfate, isopropylnaphthyltrimethylammonium chloride, octadecyl pyridinium bromide, I-(Z-hydroxyethyl)-2-heptadecenyl-1-(4-chlorobutyl) imidazolinium chloride, hexadecylmethylpiperidinium methosulfate, dodecylhydroxyethylmorpholinium bromide, and N-cetyl-N-ethyl morpholinium ethosulfate.

The surfactant can be present in the water stream in an amount of less than or equal to 2 weight percent (wt. %), for example greater than 0 to 2 wt. %, or 0.001 to 2 wt. %, or 0.005 to 1 wt. %. In an embodiment, the surfactant is present in the produced water in an amount of 50 to 400 parts per million (ppm), including approximately 50 ppm, 75 ppm, 100 ppm, 150 ppm, 200 ppm, 250 ppm, 300 ppm, 350 ppm, and 400 ppm.

The particulate support can comprise any suitable inorganic or organic material in particulate form. Exemplary inorganic materials can comprise sand; silica beads or granules; high silicate glass; glass beads; glass sand; zeolite;

mineral sands such as olivine, hematite, goethite; diatomaceous earth; iron oxyhydroxide granules; iron oxide granules; ceramic beads or granules; iron metal granules or beads; iron metal coated beads or granules; synthetic or natural iron coated sand, and the like, or a combination comprising at least one of the foregoing. Exemplary organic materials can include polystyrene beads; polyethylene beads; modified cationic surface polymer beads; modified anionic surface polymer beads; mixed or pure polymer beads or granules; polymer coated inorganic beads or granules; and the like, or a combination comprising at least one of the foregoing. Some of the above-described materials can have naturally occurring reactive sites that can be maintained or supplemented by the addition of active reagents such as a hydrous iron oxide precursor.

In some embodiments, the particulate support comprises sand, and is preferably a bed of moving sand. Generally the preferred filtration media in the process disclosed herein is sand due to its stability and cost effectiveness. Additional advantages of sand as the preferred filtration media include the well-known filtration properties of sand, its routine application in water treatment, its natural reactive silicate surface for iron oxide binding to form hydrous iron oxide-coated sand, and its abrasion properties.

The particulate support comprises a hydrous iron oxide coating. The hydrous iron oxide coating comprises one or more iron cations, oxide ions, hydroxide ions, an indeterminate quantity of water, or a combination comprising at least one of the foregoing. For example, the hydrous iron oxide coating can include an iron oxide, an iron hydroxide, an iron oxyhydroxide, a hydrated derivative thereof, or a combination comprising at least one of the foregoing. The hydrous iron oxide coating can be prepared by contacting a hydrous iron oxide precursor with the particulate support. In some embodiments, other metals including but not limited to aluminum sulfate are contemplated for forming a coating disposed on the particulate support.

In some embodiments, the method comprises adding a hydrous iron oxide precursor to the water stream to form the iron oxide coating in situ. In such embodiments, the hydrous iron oxide coating on the particulate support can be formed from the hydrous iron oxide precursor in situ. In some embodiments, the hydrous iron oxide-coated particulate support can be formed prior to contacting the water stream with the particulate support. In other embodiments, the hydrous iron oxide coating is preformed, before contact with the water stream.

The hydrous iron oxide precursor can include ferric chloride, ferrous chloride, ferric sulfate, ferrous sulfate, or a combination comprising at least one of the foregoing. The hydrous iron oxide precursor can be present in the water stream at a hydrous iron oxide precursor:surfactant molar ratio of 0.25:1 to 200:1. Within this range, the ratio can be at least 0.5:1, or 1:1, or 5:1. Also within this range, the ratio can be less than or equal to 100:1, or less than or equal to 50:1, or less than or equal to 10:1, or less than or equal to 5:1. For example, the ratio can preferably be 0.25:1 to 5:1, more preferably 0.25:1 to 1:1, even more preferably 0.5:1 to 1:1.

In some embodiments, the particulate support is present as a moving bed comprising the support, preferably a moving bed of sand. Without being bound by theory, it is believed that continuous motion of the particulate support can assist in continuous renewal of the hydrous iron oxide coating disposed on the surface of the sand. The physical action of the moving particulate support abrades the surface of the support particles, regenerating active sites for additional hydrous iron oxide precursor. Hence, regenerated reactive sites are continually presented to the water stream by microscopic erosion of the support surface. Abraded surfactant-iron-sand complexes can be removed by gravity separation, or by the screen filtering action of the sand bed. Gravity separation relies on the difference in densities between the water and the other components (e.g., the abraded surfactant-iron-sand complexes) for separation.

Movement can be accomplished, for example, by fluidizing or moving the bed using the fluid flow, by mechanical action such as augers or mixing bars, by acoustic action such as the application of ultrasonic waves or by physical transport using compressed air. In an embodiment, movement is accomplished by fluidizing the bed using compressed air.

The method further comprises separating the treated water stream from the particulate support. In some embodiments, the surfactant can be adsorbed to the hydrous iron oxide coating to provide a surfactant-iron-sand complex, and the treated water stream can be separated from the surfactant-iron-sand complex. The separating can be by, for example, filtering, centrifuging, decanting, gravity separating, and the like, or a combination comprising at least one of the foregoing separating methods, preferably by gravity separating.

The treated water stream exiting the sand bed comprises less surfactant than the water stream. For example, the treated water stream can have less than 1 weight percent, or less than 0.5 weight percent, or less than 0.1 weight percent, or less than 0.05 weight percent, or less than 0.005 weight percent residual surfactant. In some embodiments, the treated water stream has 50 ppm or less of a surfactant, for example 50 ppm or less of an anionic surfactant. In some embodiments, the treated water exiting the sand bed is devoid of residual surfactant. Thus the treated water stream exiting the sand bed can include an amount of surfactant that is less than the amount of surfactant that is believed to have an environmental impact.

In some embodiments, the method comprises at least partially degrading the surfactant. The terms "degradation", "degradable", or "degrading" refer to the conversion of materials into smaller components, intermediates, or end products by the result of hydrolytic degradation, biologics (e.g., bacteria or enzymes), chemical reactions, thermal reactions, reactions induced by radiation, and the like, or a combination comprising at least one of the foregoing. In some embodiments, the degradation is preferably by chemical reaction, for example, oxidative degradation. Oxidative degradation of surfactants can be by addition of an oxidizing agent, for example ozone, ferrate(IV), or a combination comprising at least one of the foregoing.

In some embodiments, the surfactant can be at least partially degraded, and the degraded surfactant adsorbed to the hydrous iron oxide coating to provide a degraded surfactant-iron-sand complex. In some embodiments, the surfactant can be adsorbed to the hydrous iron oxide coating to provide a surfactant-iron-sand complex, and the surfactant of the surfactant-iron-sand complex can be at least partially degraded. In some embodiments wherein the treated water stream comprises residual surfactant, the method can further comprise at least partially degrading the residual surfactant of the treated water stream, for example after the treated water stream is separated from the particulate support.

In general, there are no particular requirements on the pH of the water. In some embodiments, the produced water can be used directly (e.g., as recovered from an oil well) without adjusting the pH prior to contacting the water stream with the bed of moving sand. In some embodiments, the produced water can contact the moving sand bed at a pH of 2 to 14, preferably 4 to 12, more preferably 5 to 10. In general, there are no particular requirements on the temperature of the produced water stream entering the sand bed. In some embodiments, the temperature of the produced water stream entering the sand bed is 20 to 100° C., preferably 70 to 95° C. In some embodiments, the temperature of the produced water stream entering the sand bed is greater than or equal to 100° C., for example in a pressurized system.

In some embodiments, the water stream can be pretreated prior to contacting the moving sand bed or prior to adding the hydrous iron oxide precursor. The water stream can generally be treated by any process that can be utilized in the normal processing of produced water, including by filtration, deionization, softening, aeration, chemical treatment, flocculation, clarification, oxidation, blending with an alternate water source, and the like, or a combination comprising at least one of the foregoing treatments. For example, the water can be oxidized prior to introducing the hydrous iron oxide precursor to the water stream. Oxidizing the water can be by aeration or addition of Fenton's reagent, ozone, hydrogen peroxide plus ozone, ultraviolet radiation treatment, or any other oxidation method that is generally known.

In some embodiments, the method further comprises discharging the treated water stream into the natural environment, for example, the ocean. Of course the stream may also be recirculated for use in the process producing the stream, or discharged to a holding pond, holding, tank, or the like.

The method for removing a surfactant from produced waters disclosed herein advantageously allows for a continuous method for removing surfactants. In embodiments wherein the hydrous iron oxide-coated particulate support can be continuously regenerated due to the use of the moving bed, there is no downtime associated with reagent replacement or regeneration. Additionally, the successful removal of the surfactants from the produced water allows for discharge of the treated water into the natural environment, for example by "over-boarding" into the ocean.

EXAMPLES

In the following example, a surfactant was removed from a water stream using low concentrations of ferric chloride. The water stream included a surfactant and deionized (DI) water. The surfactant used for the following example was a $C_{19-23}$ internal olefin sulfonate available from Shell under the trade name ENORDET 0342. ENORDET 0342 is an exemplary surfactant used in formulations for enhanced oil recovery (EOR).

A solution of ENORDET 0342 in DI water was prepared at a concentration of 2000 ppm. It should be noted that while a relatively high concentration of 2000 ppm of surfactant was used for this example, produced water streams are expected to contain surfactants in significantly lower concentrations (e.g., 50 to 500 ppm).

Figure 1B:
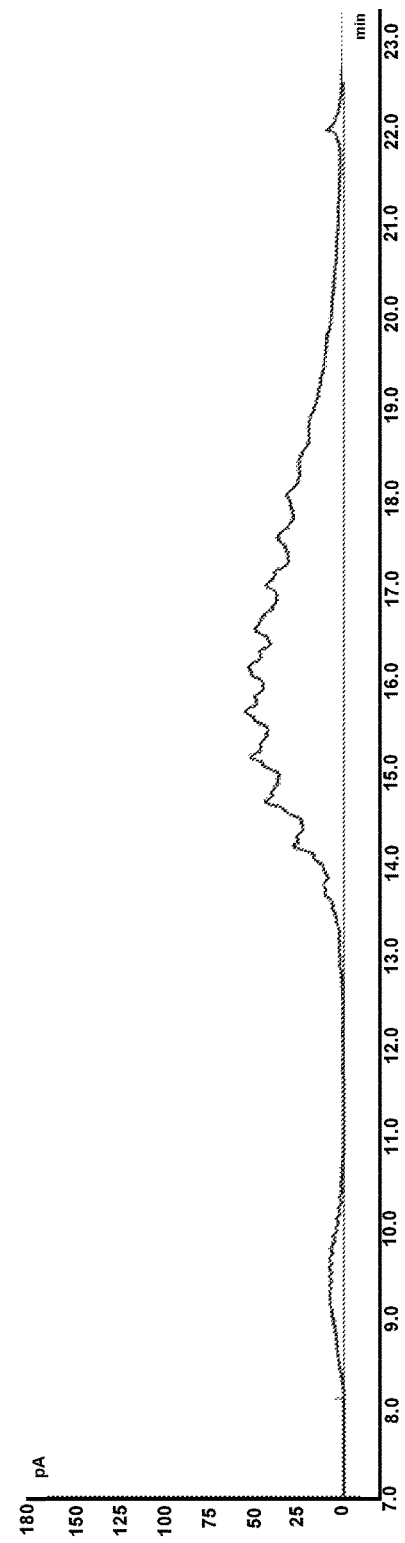
FIG. 1B is a chromatogram of a solution comprising a surfactant in water.

High performance liquid chromatography (HPLC) was used to characterize the surfactant-containing solution. FIG. 1A shows the HPLC chromatogram of the 2000 ppm solution of ENORDET 0342 in DI water. The surfactant was eluted from 8 to 23 minutes. FIG. 1B shows a magnified section the HPLC chromatogram to better visualize the surfactant peak. The peak area for the surfactant was 217.53 pA*minute.

Ferric chloride (372 ppm) was added to the surfactant-containing solution to demonstrate the interaction of the surfactant with hydrous iron oxide.

Figure 2A:
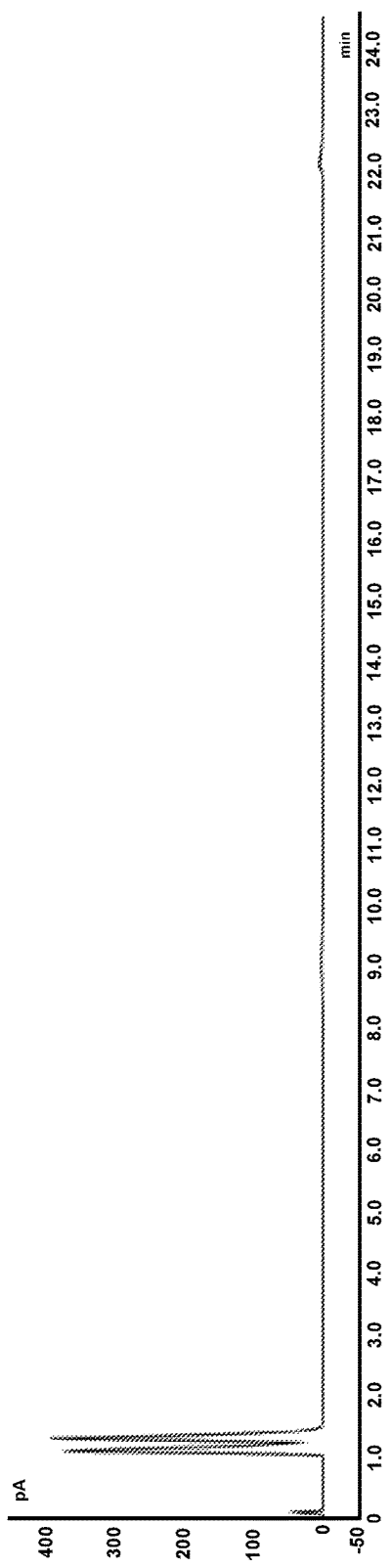
FIG. 2A is a chromatogram of a treated surfactant solution following contact with a hydrous iron oxide.
Figure 2B:
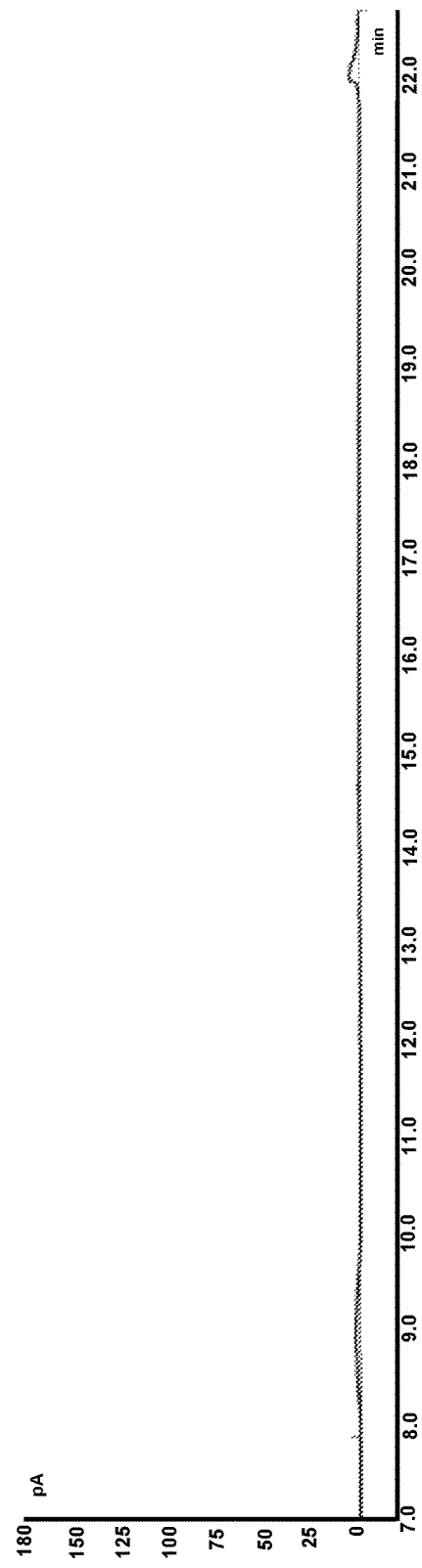
FIG. 2B is a chromatogram of a treated surfactant solution following contact with a hydrous iron oxide.
Figure 3:
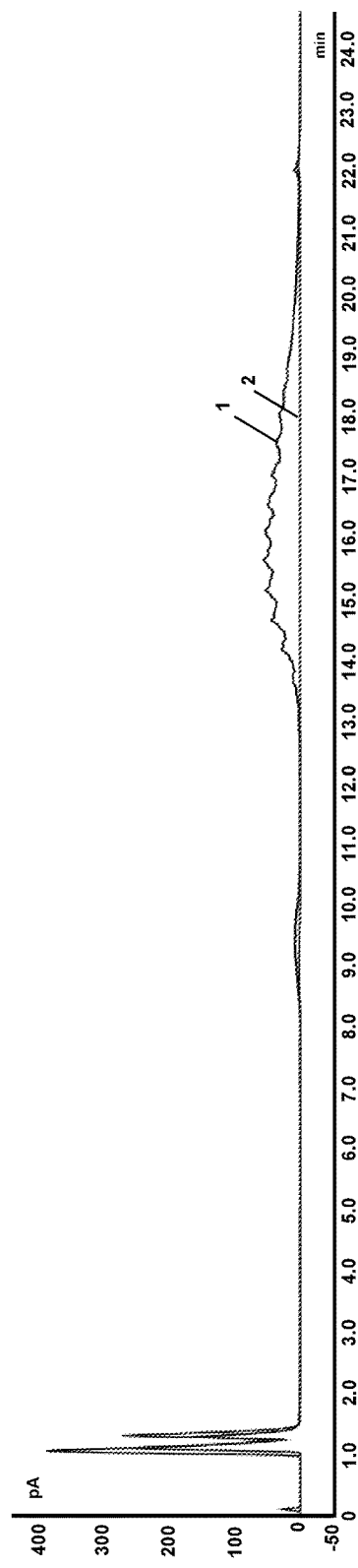
FIG. 3 shows an overlay of a chromatogram of a surfactant solution (1) and a chromatogram of the same solution following treatment with a hydrous iron oxide (2).

The iron-containing solution was then filtered through a 0.22 micrometer filter to remove the iron, and any adsorbed surfactant. The filtrate was characterized using HPLC (FIG. 2A). FIG. 2B shows a magnified section the HPLC chromatogram of FIG. 2A. FIGS. 2A and 2B show that there is no measureable surfactant peak in the HPLC chromatogram of the treated solution, indicating that the surfactant concentration has been reduced to below the detection limit (approximately 50 ppm). The peak area for the surfactant in the chromatogram of FIG. 2B was 4.05 pA*minute, a 98% reduction in the amount of surfactant compared to the initial surfactant-containing solution. FIG. 3 shows an overlay of the HPLC chromatograms of the initial surfactant-containing solution (1) and the treated solution (2), further demonstrating that the surfactant was effectively removed by treatment with hydrous iron oxide.

In general, the invention may alternately comprise, consist of, or consist essentially of, any appropriate components herein disclosed. The invention may additionally, or alternatively, be formulated so as to be devoid, or substantially free, of any components, materials, ingredients, adjuvants or species used in the prior art compositions or that are otherwise not necessary to the achievement of the function and/or objectives of the present invention.

All ranges disclosed herein are inclusive of the endpoints, and the endpoints are independently combinable with each other. "Combination" is inclusive of blends, mixtures, alloys, reaction products, and the like. Furthermore, the terms "first," "second," and the like, herein do not denote any order, quantity, or importance, but rather are used to denote one element from another. The terms "a" and "an" and "the" herein do not denote a limitation of quantity, and are to be construed to cover both the singular and the plural, unless otherwise indicated herein or clearly contradicted by context. "Or" means "and/or." Reference throughout the specification to "one embodiment," "another embodiment," "an embodiment," and so forth, means that a particular element described in connection with the embodiment is included in at least one embodiment described herein, and may or may not be present in other embodiments. In addition, it is to be understood that the described elements may be combined in any suitable manner in the various embodiments.

While the invention has been described in detail in connection with only a limited number of embodiments, it should be readily understood that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for removing a surfactant from a water stream, the method consisting essentially of:
    providing a water stream comprising produced water containing surfactant recovered from an oil well,
    contacting the water stream with a particulate support comprising sand with a hydrous iron oxide coating,
    absorbing said surfactant to said hydrous iron oxide coating to provide a surfactant-iron-sand complex, and separating the water stream from said particulate support to thereby provide a treated water stream comprising less surfactant than the water stream.

2. The method of claim 1, wherein said hydrous iron oxide coating is formed by adding a hydrous iron oxide precursor to the water stream to form the hydrous iron oxide coating.

3. The method of claim 1, wherein the particulate support is a bed of moving sand.

4. The method of claim 1, wherein the treated water stream has less than 1 wt. % residual surfactant.

5. The method of claim 1, wherein said surfactant is at least partially degraded.

6. The method of claim 3, wherein said surfactant is at least partially degraded and adsorbing the degraded surfactant to the hydrous iron oxide coating to provide a degraded surfactant-iron-sand complex.

7. The method of claim 1, wherein the surfactant of the surfactant-iron-sand complex is at least partially degraded.

8. The method of claim 1, wherein the separating is by gravity separating, filtering, centrifuging, decanting, or a combination comprising at least one of the foregoing separating methods, preferably by gravity separating.

9. The method of claim 1, wherein the surfactant is present in the water stream in an amount of 50 to 400 ppm.

10. The method of claim 1, wherein the surfactant is an anionic surfactant.

11. The method of claim 10, wherein the anionic surfactant comprises a C4-25 alkyl sulfonate, a C6-25 alkylaryl sulfonate, a C4-25 alkyl sulfate, or a salt thereof, or a combination comprising at least one of the foregoing.

12. The method of claim 1, wherein the surfactant comprises dodecylsulfate or an alkali metal salt thereof.

13. The method of claim 2, wherein the hydrous iron oxide precursor comprises ferric chloride, ferrous chloride, ferric sulfate, ferrous sulfate, or a combination comprising at least one of the foregoing.

14. The method of claim 3, wherein the contacting comprises passing the water through the bed of moving sand.

15. The method of claim 2, wherein the hydrous iron oxide precursor is present in the water stream at a hydrous iron oxide precursor:surfactant molar ratio of 0.25:1 to 5:1.

16. The method of claim 2, wherein
the water stream is a produced water stream recovered from an oil well;
the hydrous iron oxide precursor comprises ferric chloride; and
the surfactant is an anionic surfactant in an amount of 50 to 400 ppm.

17. The method of claim 2, comprising oxidizing the water stream prior to introducing the hydrous iron oxide precursor to the water stream.

* * * * *